United States Patent
Ricketts et al.

(10) Patent No.: US 9,256,623 B2
(45) Date of Patent: Feb. 9, 2016

(54) SYSTEM, METHOD, AND COMPUTER PROGRAM PRODUCT FOR SCHEDULING TASKS ASSOCIATED WITH CONTINUATION THREAD BLOCKS

(71) Applicant: NVIDIA Corporation, Santa Clara, CA (US)

(72) Inventors: Scott Ricketts, San Francisco, CA (US); Luke David Durant, Santa Clara, CA (US); Brian Scott Pharris, Cary, NC (US); Igor Sevastiyanov, San Jose, CA (US); Nicholas Wang, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 214 days.

(21) Appl. No.: 13/890,184

(22) Filed: May 8, 2013

(65) Prior Publication Data

US 2014/0337389 A1 Nov. 13, 2014

(51) Int. Cl.
*G06F 9/46* (2006.01)
*G06F 7/00* (2006.01)
*G06F 17/30* (2006.01)
*G06F 9/52* (2006.01)

(52) U.S. Cl.
CPC ............ *G06F 17/30292* (2013.01); *G06F 9/52* (2013.01); *G06F 17/30289* (2013.01)

(58) Field of Classification Search
CPC .................................... G06F 9/52; G06F 7/00
See application file for complete search history.

(56) References Cited

U.S. PATENT DOCUMENTS

| | | |
|---|---|---|
| 7,539,988 B1 | 5/2009 | Hersh |
| 2002/0138679 A1 | 9/2002 | Koning et al. |
| 2009/0002379 A1 | 1/2009 | Baeza et al. |
| 2009/0323820 A1 | 12/2009 | Wu et al. |
| 2014/0143519 A1* | 5/2014 | Heidelberger et al. ....... 711/214 |
| 2014/0229953 A1 | 8/2014 | Sevastiyanov et al. |

OTHER PUBLICATIONS

Non-Final Office Action from U.S. Appl. No. 13/766,595, dated Jul. 6, 2015.
Sevastiyanov et al., U.S. Appl. No. 13/766,595, filed Feb. 13, 2013.
Non-Final Office Action from U.S. Appl. No. 13/766,595, dated Jan. 9, 2015.

* cited by examiner

*Primary Examiner* — Camquy Truong
(74) *Attorney, Agent, or Firm* — Zilka-Kotab, PC

(57) ABSTRACT

A system, method, and computer program product for scheduling tasks associated with continuation thread blocks. The method includes the steps of generating a first task metadata data structure in a memory, generating a second task metadata data structure in the memory, executing a first task corresponding to the first task metadata data structure in a processor, generating state information representing a continuation task related to the first task and storing the state information in the second task metadata data structure, executing the continuation task in the processor after the one or more child tasks have finished execution, and indicating that the first task has logically finished execution once the continuation task has finished execution. The second task metadata data structure is related to the first task metadata data structure, and at least one instruction in the first task causes one or more child tasks to be executed by the processor.

19 Claims, 10 Drawing Sheets

| Task Meta Data 400 | |
| --- | --- |
| Program_Offset | 410 |
| Grid_Dimensions | 420 |
| Block_Dimensions | 430 |
| Resources | 440 |
| Cache_Control | 450 |
| Memory_Barriers | 460 |
| Semaphores | 470 |
| Pending_Counter | 480 |
| Out_Dependence | 490 |
| ⋮ | |

*Fig. 4*

```
GRID_TMD 501

1            480

.
  .
  .
```

```
QUEUE_TMD 511         QUEUE 512

2            480      ENTRY_0   521
                      ENTRY_1   522
   .                  ENTRY_1   523
   .
   .                     .
                         .
                         .
```

*Fig. 5A*

| GRID_TMD 501 | | QUEUE_TMD 511 | | QUEUE 512 | |
|---|---|---|---|---|---|
| 4 | 480 | 1 | 480 | ENTRY_0 | 521 |
| | | | | ENTRY_1 | 522 |
| | | | | ENTRY_1 | 523 |
| ⋮ | | ⋮ | | ⋮ | |

| GRID_TMD 531 | | GRID_TMD 541 | |
|---|---|---|---|
| 1 | 480 | 1 | 480 |
| EOC_551* | 490 | EOC_551* | 490 |
| ⋮ | | ⋮ | |

| EOC_TMD 551 | |
|---|---|
| 1 | 480 |
| Queue_511* | 490 |
| ⋮ | |

*Fig. 5C*

SYSTEM, METHOD, AND COMPUTER PROGRAM PRODUCT FOR SCHEDULING TASKS ASSOCIATED WITH CONTINUATION THREAD BLOCKS

This invention was made with Government support under LLNS subcontract B599861 awarded by DOE. The Government has certain rights in this invention.

FIELD OF THE INVENTION

The present invention relates to task management, and more particularly to hardware and software scheduling mechanisms for tasks associated with continuation thread blocks.

BACKGROUND

Programming tasks are typically implemented by generating a data structure in a memory that includes information associated with instructions and data to be processed by those instructions. Some tasks may be configured to launch child tasks that complete auxiliary work related to the task. The task may be stalled while the child work is completed. The task saves the state related to the task, which may be restored at some point in the future once the child task has completed the auxiliary work.

However, conventional mechanisms associated with related tasks are not efficient at avoiding deadlock conditions. Sometimes, too many child threads may be launched such that resources are starved that don't allow child tasks to finish executing. Too many thread blocks may be active and resident in the processor, causing the active tasks to stall on completion of the child tasks, which in turn cannot be executed because the active tasks have locked all available resources. Thus, there is a need for addressing this issue and/or other issues associated with the prior art.

SUMMARY

A system, method, and computer program product for scheduling tasks associated with continuation thread blocks is described. The method includes the steps of generating a first task metadata data structure in a memory, generating a second task metadata data structure in the memory, executing a first task corresponding to the first task metadata data structure in a processor, generating state information representing a continuation task related to the first task and storing the state information in the second task metadata data structure, executing the continuation task in the processor after the one or more child tasks have finished execution, and indicating that the first task has logically finished execution once the continuation task has finished execution. The second task metadata data structure is related to the first task metadata data structure, and at least one instruction in the first task causes one or more child tasks to be executed by the processor.

BRIEF DESCRIPTION OF THE DRAWINGS

FIG. 4 illustrates a task metadata data structure, in accordance with one embodiment;

FIG. 5A illustrates a technique for scheduling tasks associated with a continuation thread block, in accordance with one embodiment;

FIG. 5C illustrates a mechanism for signaling the completion of all child tasks, in accordance with one embodiment;

DETAILED DESCRIPTION

A hardware scheduling mechanism for a multi-threaded processor is described below. The hardware scheduling mechanism provides a means to implement task scheduling, including out-of-order execution of tasks, prioritization of tasks, and pre-emption of tasks. A task is associated with a task metadata data structure that encapsulates the task state necessary for configuring a processing unit to complete some subset of work (i.e., a program kernel configured to process data). In one embodiment, a central processing unit (CPU) is coupled to a parallel processing unit (PPU) and the PPU is configured to execute one or more tasks. The tasks are written to a memory accessible by the PPU by either a device driver executing on the CPU or predecessor tasks executed on the PPU. In order to launch a task on the PPU, a method call is sent to the PPU that points to a task metadata data structure in the memory. The PPU then loads the task state defined by the task metadata data structure from the memory and launches the task on a processing unit of the PPU.

Figure 1:
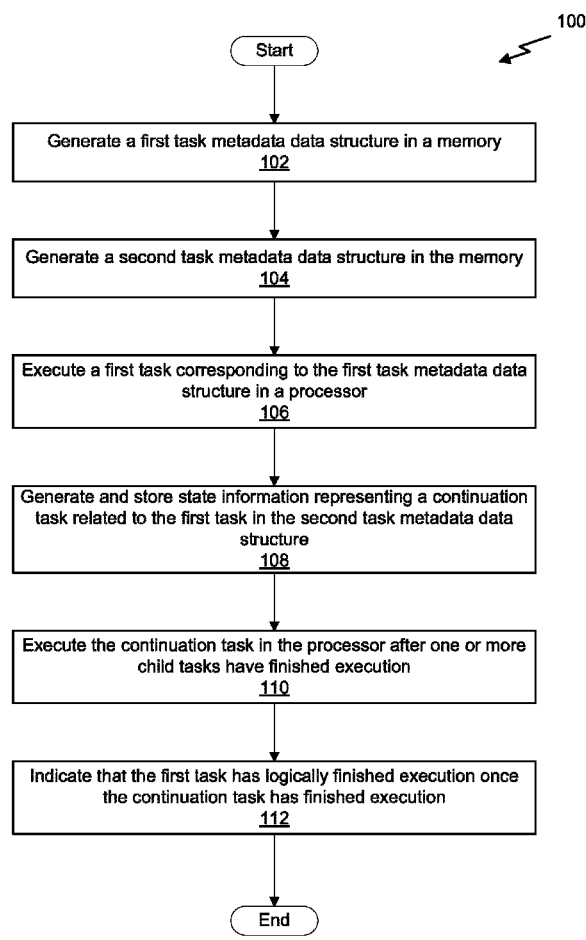
FIG. 1 illustrates a flowchart of a method for writing task metadata to a memory, in accordance with one embodiment.

FIG. 1 illustrates a flowchart of a method 100 for scheduling tasks associated with continuation thread blocks, in accordance with one embodiment. At step 102, a first task metadata data structure is generated in a memory. A task data structure comprises a plurality of bits representing one or more fields that encapsulate state information relating to a task. At step 104, a second task metadata data structure is generated in the memory. The second task metadata data structure is related to the first task metadata data structure and can store state information for one or more continuation thread blocks associated with a continuation task. A continuation task represents work comprising one or more instructions that are dependent on at least one intermediate value generated by one or more child tasks launched by the first task (i.e., the parent task). At step 106, the first task is executed in a processor. The state information utilized to launch the first task is stored in the first task metadata data structure.

At step 108, state information representing a continuation task is generated in the memory and stored in the second task metadata data structure. At step 110, the continuation task is executed by the processor after the one or more child tasks have finished execution. At step 112, once the continuation task has finished executing, state information in the first task metadata data structure is modified to indicate that the first task has logically finished execution.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
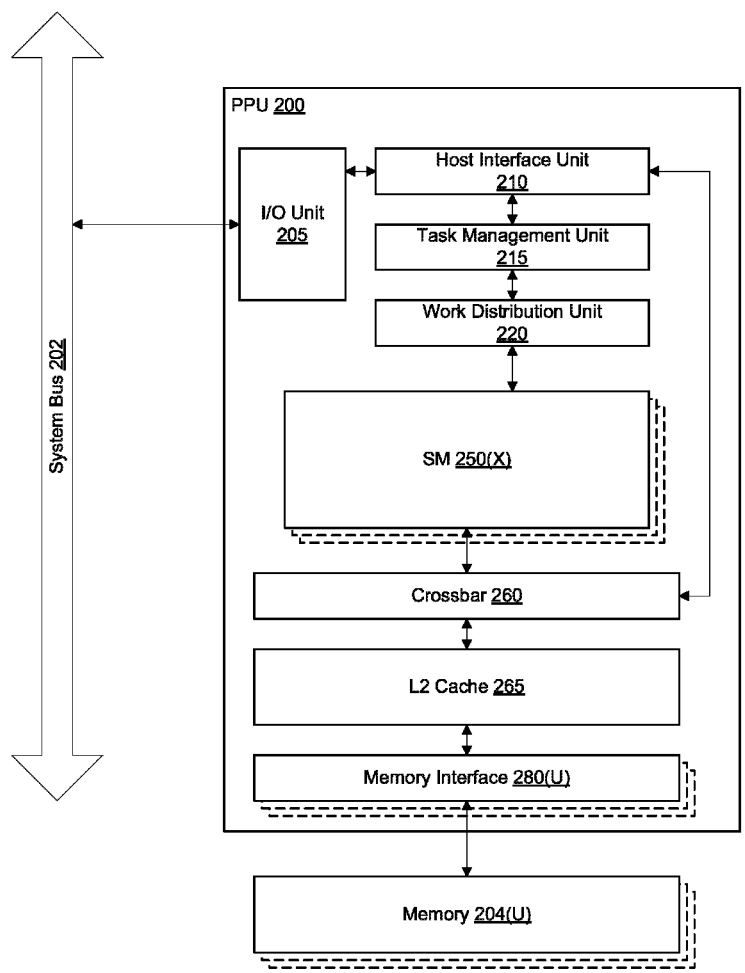
FIG. 2 illustrates a parallel processing unit, according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory. A thread block may also be referred to as a cooperative thread array (CTA).

In one embodiment, the PPU 200 comprises X SMs 250 (X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
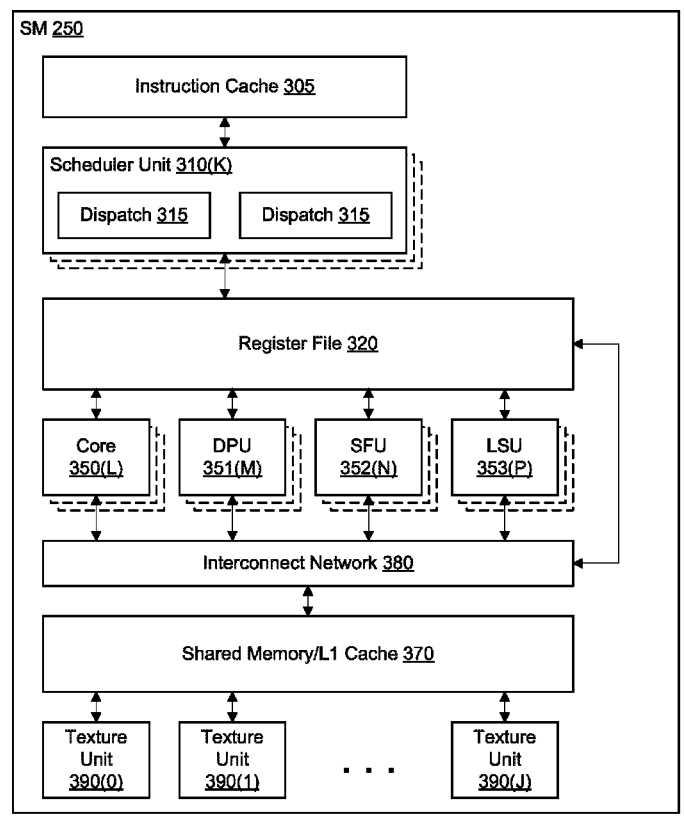
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mipmaps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Task Management Unit

FIG. 4 illustrates a task metadata (TMD) 400 data structure, in accordance with one embodiment. The TMD 400 includes a plurality of fields that encapsulate task state information associated with a task. In one embodiment, the TMD 400 includes a program offset field 410, a grid dimensions field 420, a block dimensions field 430, a resources field 440, a cache control field 450, a memory barriers field 460, a semaphores field 470, a pending counter field 480, and an output dependence field 490. Although not shown, the TMD 400 may include other fields in addition to the fields shown in FIG. 4. It will be appreciated that the TMD 400 shown in FIG. 4 is for illustrative purposes only. The particular fields included in the TMD 400 encapsulate the task state required to configure a processing unit (e.g., the SM 250) to execute the task. Consequently, when a TMD 400 is implemented for different architectures, the corresponding TMD 400 may include fields in addition to or in lieu of the fields shown in FIG. 4.

In one embodiment, the program offset field 410 stores a memory offset for the start of program instructions for the task. The grid dimensions field 420 includes grid dimensions for the grid. A grid is an array of thread blocks generated to implement the program specified by the program offset field 410 on different sets of input data (e.g., pixel data) corresponding to each thread. The grid may be one-dimensional, two-dimensional, three-dimensional, or n-dimensional. In one embodiment, the grid dimensions field 420 includes an x-dimension, a y-dimension, and a z-dimension for the size of a three-dimensional grid array. The block dimensions field 430 stores the dimension for each of the thread blocks and is equal to the number of threads included in each thread block (e.g., 32). The resources field 440 includes state information related to hardware resources allocated to the task. For example, the resources field 440 may include a location and size of a circular queue, implemented in a memory, that stores thread blocks to be added to the task. The cache control field 450 includes data associated with configuring the cache. For example, the cache control field 450 may include data that specifies what portion of the L1 cache/shared memory 270 is configured as a cache and what portion is configured as a shared memory. The cache control field 450 may also specify how much memory is allocated to each thread in a thread block. The memory barriers field 460 may include counters that are configured to manage task dependency. Similarly, the semaphores field 470 may include pointers to semaphores that should be released when a task is completed.

The TMD 400 defines, in the memory 204, the encapsulated state information necessary to execute a particular task on a processing unit of the PPU 200. In other words, the TMD 400 may be generated in the memory 204 and the fields of the TMD 400 may be filled by software, either a device driver or application executing on the CPU or a different task executing on the PPU 200, and then a pointer to the TMD 400 is passed to the TMU 215 in the PPU 200 to indicate that the task is ready to be scheduled. In some system implementations, the TMD 400 for a task is written into a system memory (i.e., a memory associated with the CPU) and then copied to a video memory (i.e., memory 204). One mechanism for copying the task to the video memory involves transmitting packets of data from the system memory to the PPU 200 via the system bus 202. The PPU 200 then uses various hardware engines to store the data in the video memory. Once the PPU 200 is ready to schedule the task, the TMD 400 (or at least portions of the TMD 400) is read from the video memory into on-chip memory structures accessible by the TMU 215 and/or the SMs 250.

In one embodiment, the TMD 400 includes a pending counter field 480. The pending counter field 480 holds an integer value that indicates how many other pending actions must be completed before the task associated with the TMD 400 is logically complete. In other words, another related task may be executing that prevents the task associated with the TMD 400 from finishing. When a TMD 400 is initiated, the pending counter field 480 may be initially set to one (1) that indicates that the TMD 400 will be logically complete when the grid of CTAs associated with the task corresponding to the TMD 400 has finished executing. In modern parallel processing architectures, tasks executing on the processor may be able to spawn one or more child tasks. For example, instructions in a CTA referenced by the TMD 400 may generate a new TMD corresponding to a child task in the memory 204. The child task may generate, e.g., an intermediate value for use by one or more instructions in the CTA referenced by the TMD 400. For example, the child task may sample an image to find an average value for the pixel colors in the image. The parent task may use this intermediate value for another calculation. The parent task may execute up to a point where the intermediate value is going to be calculated by a child task. The parent task then generates a TMD 400 in memory 204 corresponding to the child task and launches the child task. The parent task may then increment the pending counter field 480 to indicate that the child task needs to finish as well as the parent task before the parent task is logically complete. The parent task may then be evicted from the processor until the child task has finished executing. Once the child task has finished executing, the pending counter field 480 of the TMD 400 is decremented to indicate that the child task has finished and the parent task can then logically finish once any other instructions or child tasks have completed execution. A more detailed explanation of the use of the pending counter field 480 in relation to generating new tasks is set forth below in conjunction with FIGS. 5A through 5C.

As shown in FIG. 4, the TMD 400 may also include an output dependence field 490. The output dependence field 490 is a pointer to a TMD 400 for a different task that is dependent on the completion of the task associated with the TMD 400 for execution. In one embodiment, the TMU 215 is configured to decrement a reference counter field (not explicitly shown in FIG. 4) that indicates whether the task corresponding to the TMD 400 is dependent on the completion of any predecessor tasks before the task may be executed. Once the reference counter field in the TMD 400 is decremented to zero (0), then the task may be scheduled and launched by the TMU 215 and the WDU 220, respectively.

FIG. 5A illustrates a technique for scheduling tasks associated with a continuation thread block, in accordance with one embodiment. As shown in FIG. 5A, a task may be initiated by generating a first TMD (GRID_TMD) 501 in memory 204. The first TMD 501 may initialize the pending counter field 480 to one to indicate that the work associated with the task has not been completed. The first task corresponds to a grid of CTAs configured to perform a set of work. Again, each CTA is a group of threads configured to perform work on a set of data. At some point within one or more threads in the CTA, the program instructions for the thread may be configured to spawn (i.e., generate) one or more child tasks. The child tasks may perform work that produces an intermediate result that can be used by the threads of the parent task. Once the child tasks have been generated in the memory 204, then the threads of the parent task should be stalled while the child tasks are complete. However, when the parent task is stalled, the parent task should be evicted from the SM 250 such that the newly pending child tasks can be allocated resources, such as a processor (i.e., and SM 250) on which to be executed. Otherwise, the PPU 200 could quickly become deadlocked when all of the SMs 250 executing stalled tasks are idle and the tasks that the stalled tasks are waiting to complete have no resources on which to be processed.

In one embodiment, the parent task may initialize a continuation task that includes the work from the parent task that is executed after the child tasks have completed execution. As shown in FIG. 5A, the continuation task may be associated with a second TMD (i.e., QUEUE_TMD) 511 that is similar to the first TMD 501. However, unlike the first TMD 501, the second TMD 511 corresponds to a special type of task, which can receive additional CTAs for execution after the task has been launched. In other words, the size or dimensions of the QUEUE_TMD 511 are not necessarily specified before the task is launched. The special type of task may be referred to herein as a queue task. In addition to the second TMD 511, the queue task is also associated with a circular FIFO (i.e., queue) 512 that is stored in memory 204. The queue 512 holds a plurality of entries that include pointers to CTAs associated with the task. Unlike the first TMD 501 that includes pointers to a grid of CTAs that are fully defined in the memory 204 when the parent task is launched, the second TMD 511 includes a pointer to the queue 512 that may or may not include pointers to one or more CTAs when the continuation task is launched.

In one embodiment, when a logical task is generated by software, the software generates both a grid TMD 501 and a queue TMD 511 in memory 204. The grid TMD 501 may store the state associated with a defined grid of CTAs for the task. The queue TMD 511 is generated to store continuation work that is to be completed after one or more child tasks have been launched and returned intermediate values to be processed by the parent task. The queue 512 may also be generated in the memory 204 which provides a place for the threads in the parent task to insert CTAs that represent the work that needs to be restored when the one or more child tasks have been completed. In another embodiment, the grid TMD 501 may be initialized and launched and the queue TMD 511 is only initialized once the task corresponding to the grid TMD 501 has reached an instruction to spawn a child task.

As the threads of a CTA in the parent task execute, the threads may come to a set of instructions that are configured to generate one or more child tasks to perform some intermediate work. The threads generate the one or more child tasks by initializing additional TMDs (not shown in FIG. 5A) in the memory 204. Then, the threads in the CTA in the parent task may generate new CTAs to be added to the queue TMD 511. The threads may create a new CTA in memory 204 and add a pointer to the new CTA to the queue 512. The new CTAs represent the work to be restored from the CTAs in the parent task once the child tasks have been executed. In other words, the new CTAs include the instructions from the original CTAs that would be executed after the child tasks have been completed. The pointers are stored in the entries (e.g., 521, 522, 523) of the queue 512. Once the CTA in the parent task has completed these tasks, the parent task may be evicted from the SM 250. It will be appreciated that multiple CTAs in the grid of the parent task may spawn different child tasks and may generate associated new CTAs that are added to the queue 512.

When each of the CTAs in the grid TMD 501 have finished executing and have spawned the one or more child tasks, the task associated with the grid TMD 501 is complete and evicted from the SM 250. However, the logical task (i.e., the work encompassing the instructions to be executed after the child tasks have completed execution) is not complete, and therefore the semaphores (i.e., the one or more semaphores referenced by the semaphores field 470 in the grid TMD 501) for the parent task should not be released. In order to prevent the TMU 215 from releasing the semaphores, the TMU 215 is configured to clean up the task and release any semaphores only once the pending counter field 480 for the grid TMD 501 reaches zero. When the task associated with the grid TMD 501 is evicted from the SM 250, the TMU 215 decrements the value in the pending counter field 480 by one. However, when a thread block associated with the parent task generates a continuation thread block that is added to the queue 512, the pending counter field 480 in the grid TMD 501 is incremented by one. Therefore, the value in the pending counter field 480 in the grid TMD 501 is incremented from one to two. Alternatively, the thread block may generate a message that is passed to the TMU 215 that causes the TMU 215 to increment the pending counter field 480 in the grid TMD 501 by one. Therefore, when the grid TMD 501 is evicted from the SM 250, the TMU 215 will decrement the pending counter field 480 to a value that is greater than zero as long as there is still pending work associated with the corresponding queue TMD 511 waiting on results returned from the one or more child tasks. When the grid TMD 501 is evicted from the SM 250, the value in the pending counter field 480 in the grid TMD 501 is decremented from a value of two to one.

Figure 5B:
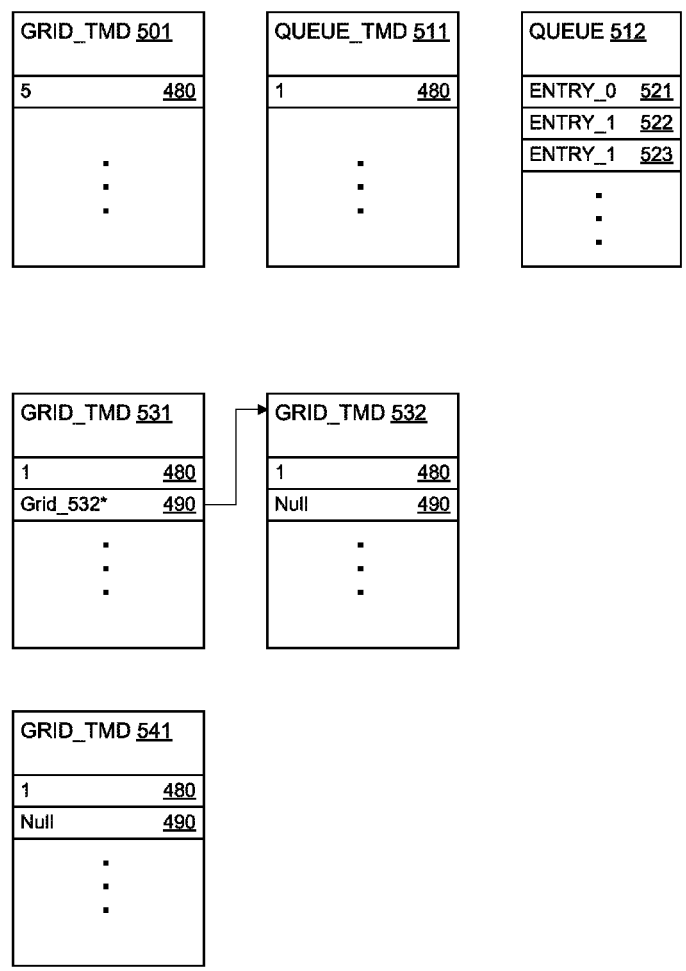
FIG. 5B illustrates a set of child tasks launched by the threads of a parent task, in accordance with one embodiment.

FIG. 5B illustrates a set of child tasks launched by the threads of a parent task, in accordance with one embodiment. As shown in FIG. 5B, a parent task is initiated by generating a grid TMD 501 in the memory 204. The pending counter field 480 is initialized to one at the time when the parent task is launched. As a part of the logical task, a queue TMD 511 associated with the grid TMD 501 is also generated in the memory 204. One or more CTAs representing work to be completed by the parent task are included in a grid and associated with the grid TMD 501. As the CTAs in the grid are executed by an SM 250, the instructions may cause one or more child tasks to be launched to perform some intermediate work. As shown in FIG. 5B, each child task may be initiated by generating a grid TMD (e.g., 531, 532, 541, etc.) in the memory 204. A pending counter field 480 for each child task may also be initialized to one. In one embodiment, for each child task created, the pending counter field 480 for the grid TMD 501 is incremented by one. Thus, for the three child tasks generated in FIG. 5B, the pending counter field 480 of the grid TMD 501 is incremented from one to four. In addition, the CTA of the parent task may also generate one or more additional CTAs that represent continuation work that is to be performed when all of the child tasks have completed their work. The one or more additional CTAs may be added to the entries of the queue 512 (e.g., entry 521, 522, 523, etc.) and the pending counter field 480 of the grid TMD 501 is incremented accordingly.

In one embodiment, the CTAs associated with the parent task may generate instructions included in the continuation thread blocks that, when executed by the SM 250, cause the pending counter field 480 of the grid TMD 501 to be decremented by one. Thus, when each continuation thread block is added to the queue 512, the pending counter field 480 of the grid TMD 501 is incremented, and when each continuation thread block has completed execution within the SM 250, the pending counter field 480 of the grid TMD 501 is decremented. In another embodiment, the pending counter field 480 of the grid TMD 501 is incremented only one time when one or more continuation thread blocks are added to the queue 512. The last CTA added to the queue 512 includes instructions for decrementing the pending counter field 480 of the grid TMD 501. Thus, instead of incrementing the pending counter field 480 for the grid TMD 501 once per each continuation thread block and decrementing the pending counter field 480 for the grid TMD 501 when each continuation thread block has finished executing, the pending counter field 480 is only incremented and decremented one time when continuation work is added to the queue 512 and when all continuation work has finished execution (i.e., when the task associated with the queue TMD 511 is finished executing).

As also shown in FIG. 5B, one or more of the child tasks may be implemented as part of a stream. A stream is a sequential ordering of dependent tasks. For example, grid TMD 531 corresponds to a first task in the stream and grid TMD 532 corresponds to a second task in the stream. The second task is dependent on the first task. In other words, the first task must finish executing before the second task can be launched. In one embodiment, the TMU 215 manages dependencies between tasks using streams. Each TMD may include an output dependence field 490 that stores a pointer to a dependent task. Similar to the pending counter field 480 which prevents a task from logical completion until the pending counter field 480 reaches zero, each TMD may also include an input dependence field (not explicitly shown) that includes a counter that must be zero before a task can be launched. For example, when a task is created, the input dependence field may be initialized to one to indicate that software is preventing the task from launch until software has finished initializing the state information in the TMD in memory 204. The input dependence field can also be incremented one time for each action that must be completed before the task may be launched. For example, the second task in the stream (i.e., the task corresponding to grid TMD 532) may include an input dependence field initialized to two—one for a software hold that prevents the task from being launched until software has completely filled out the grid TMD 532 and one for a hardware hold that prevents the task from being launched until the first task in the stream (i.e., the task corresponding to the grid TMD 531) has completed execution. The output dependence field 490 of the grid TMD 531 corresponding to the first task in the stream includes a pointer to the grid TMD 532 corresponding to the second task in the stream that causes the TMU 215 to decrement the input dependence field of the grid TMD 532 corresponding to the second task in the stream when the first task in the stream has completed execution. If no other tasks are dependent upon the completion of the execution of a task, then the output dependence field 490 in the TMD corresponding to the task may include a null pointer.

FIG. 5C illustrates a mechanism for signaling the completion of all child tasks, in accordance with one embodiment. When child tasks are created, the task associated with the queue TMD 511 is stalled until all of the child tasks have finished execution. In order to signal that each of the child tasks has completed execution, a special placeholder TMD 551 is generated, referred to herein as the end-of-child (EOC) TMD 551. The EOC TMD 551 is a placeholder TMD data structure that is executed when all of the child tasks have completed execution. In one embodiment, the task associated with the EOC TMD 551 is not launched by the TMU 215 until each of the child tasks have completed execution because the input dependence field is not decremented to zero until every child task has completed execution. The input dependence field (not shown) of the EOC TMD 551 may be incremented by one each time a TMD for a child task is generated in the memory 204. An output dependence field 490 in the TMD for each of the child tasks may be initialized with a pointer to the EOC TMD 551. For example, the output dependence field 490 of a grid TMD 531 for a first child task and the output dependence field 490 of a grid TMD 541 for a second child task may each contain a pointer to the EOC TMD 551. In addition, for each child task, the input dependence field of the EOC TMD 551 may be incremented by one. As each child task is completed, the TMU 215 decrements the input dependence field of the EOC TMD 551. Thus, when all child tasks have finished execution, the input dependence field of the EOC TMD 551 stores a value of zero and the task associated with the EOC TMD 551 may be executed.

In one embodiment, the task associated with the EOC TMD 551 is launched on an SM 250 and one or more instructions are executed related to finishing execution of all of the child tasks. For example, the one or more instructions may perform some memory resource cleanup operations, deallocating the memory used for the TMDs corresponding to the child tasks. In another embodiment, the task associated with the EOC TMD 551 may be completely executed by the TMU 215 and the task is never launched on an SM 250.

As shown in FIG. 5C, when the task associated with the EOC TMD 551 is finished executing, the TMU 215 decrements the input dependence field in the TMD pointed to by the pointer in the output dependence field 490 of the EOC TMD 551. The output dependence field 490 of the EOC TMD 551 may point to the queue TMD 511 that represents the continuation thread blocks generated by the thread blocks of the parent task. When the TMU 215 decrements the input dependence field of the queue TMD 511, the value of the input dependence field may go to zero, thereby allowing the TMU 215 to launch the CTAs in the queue 512 on the SMs 250 and completing the execution of the logical task that encompasses both the parent task and the continuation task.

Figure 6A:
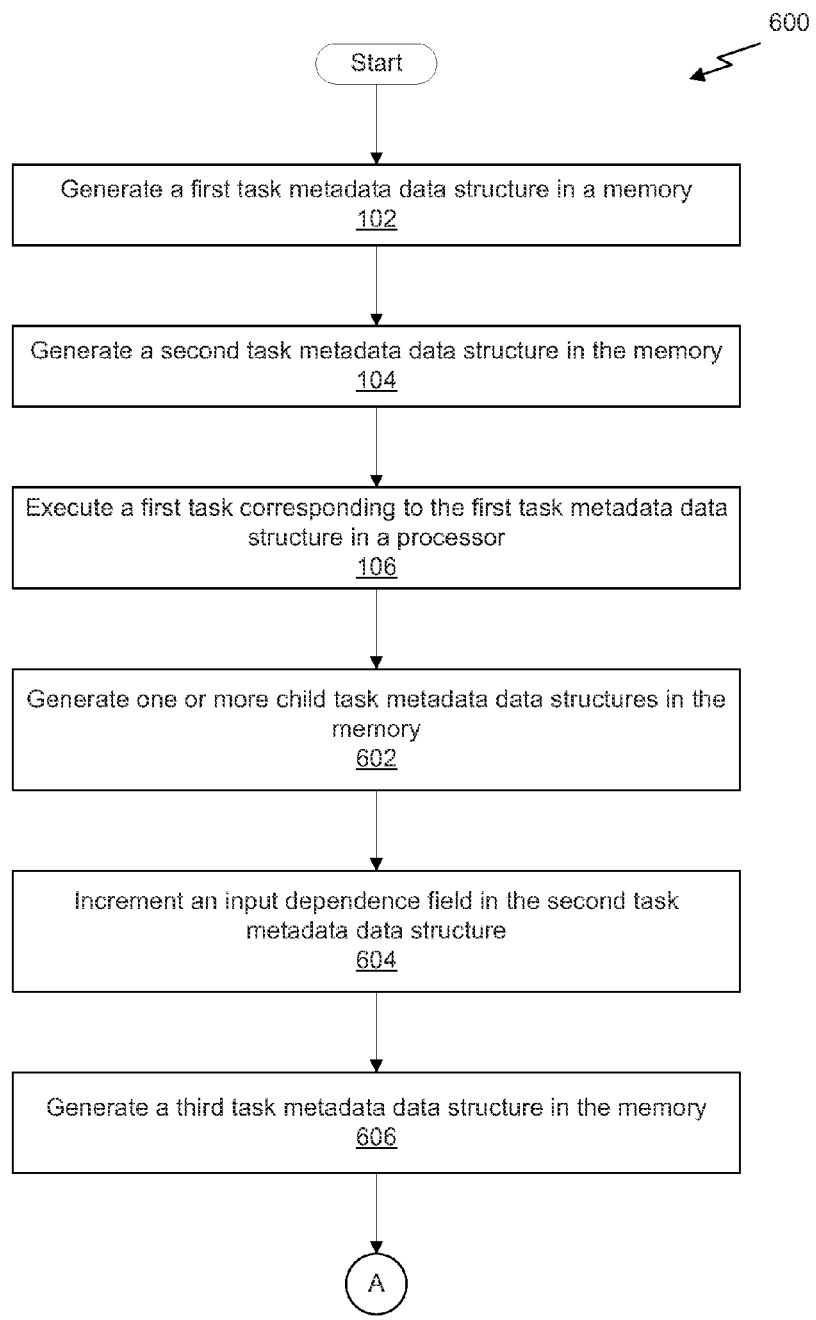
FIGS. 6A and 6B illustrate a flowchart of a method for scheduling tasks associated with continuation thread blocks, in accordance with another embodiment.
Figure 6B:
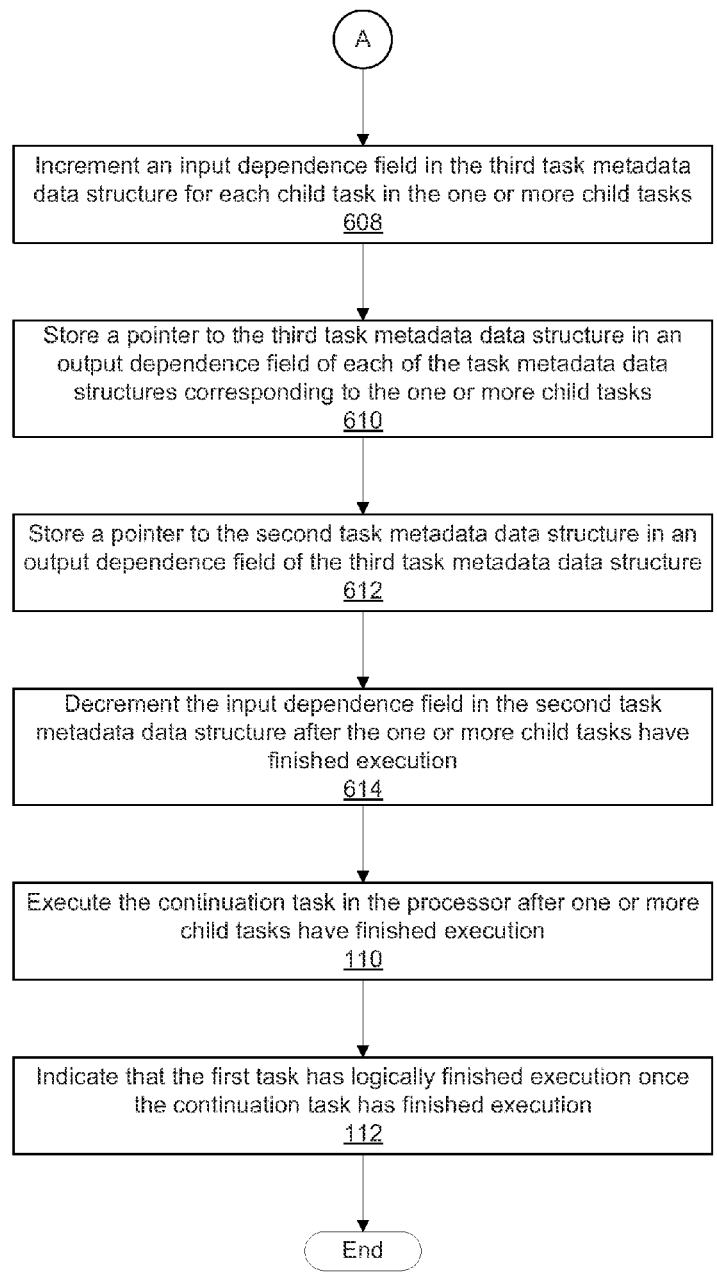

FIGS. 6A and 6B illustrate a flowchart of a method 600 for scheduling tasks associated with continuation thread blocks, in accordance with another embodiment. The method 600 begins with steps 102, 104, and 106 of method 100, set forth above. At step 602, one or more child task metadata data structure (e.g., grid TMD 531, 532, 541, etc.) are generated in the memory 204. At step 604, an input dependence field in the second task metadata data structure is incremented. In one embodiment, the input dependence field is incremented once and represents each of the one or more child tasks as a group. In another embodiment, the input dependence field is incremented once for each child task of the one or more child tasks generated in the memory 204. At step 606, a third task metadata data structure is generated in the memory 204. The third metadata data structure represents the EOC TMD 551 that indicates when each of the one or more child tasks has finished execution.

At step 608, an input dependence field in the third task metadata data structure is incremented for each child task in the one or more child tasks. At step 610, an output dependence field in the task metadata data structures for each of the one or more child tasks is modified to include a pointer to the third task metadata data structure. At step 612, a pointer to the second task metadata data structure (e.g., queue TMD 511) is stored in an output dependence field of the third task metadata data structure (e.g., the EOC TMD 551). In addition, an input dependence field in the second task metadata structure is incremented by one. At step 614, an input dependence field in the second task metadata data structure (e.g., the queue TMD 511) is decremented after the one or more child tasks have finished execution. In other words, when each of the child tasks has finished executing, the task corresponding to the EOC TMD 551 may be launched, which causes the input dependence field of the queue TMD 511 to be decremented. As the input dependence field of the queue TMD 511 reaches zero, the continuation task may be launched at step 110, described above. The method then proceeds to step 112, as set forth above in conjunction with FIG. 1.

It will be appreciated that the use of incremented and decremented are interchangeable in alternative embodiments. For example, a specific value other than zero may be used to determine when tasks can be launched, such as 1000. Then when child tasks are generated, the value may be decremented (e.g., from 999 to 998). When child tasks complete execution, the value may be incremented (e.g., from 999 to 1000). Thus, incremented, as used herein, may mean adding one to a value or subtracting one from the value and decremented may mean the opposite of incremented (i.e., subtracting one to a value or adding one to the value, respectively).

Figure 7:
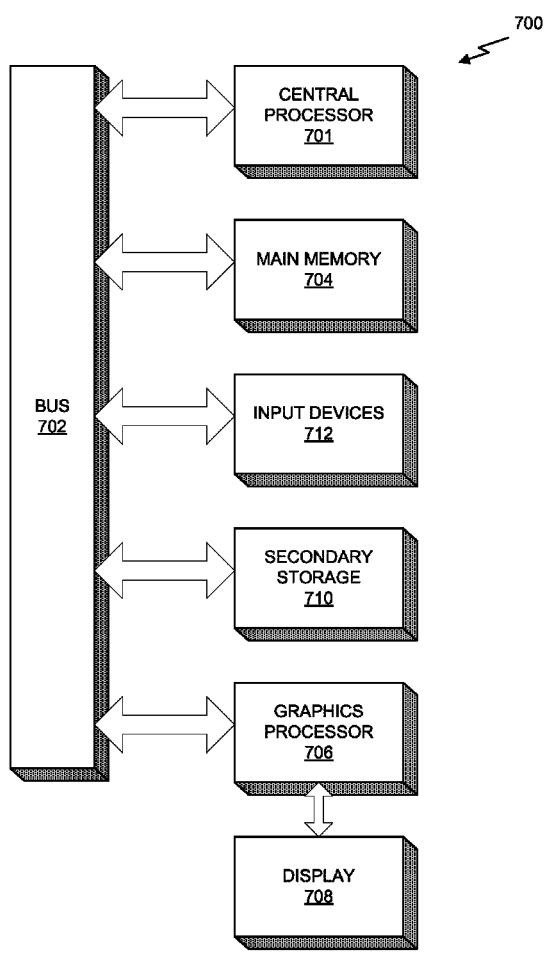
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704.

Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU). Techniques for scheduling continuation thread blocks, described above, may be implemented on the graphics processor 706 of FIG. 7.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
generating a first task metadata data structure in a memory;
generating a second task metadata data structure in the memory, wherein the second task metadata data structure is related to the first task metadata data structure;
executing a first task corresponding to the first task metadata data structure in a processor, wherein at least one instruction in the first task causes one or more child tasks to be executed by the processor;
generating state information representing a continuation task related to the first task and storing the state information in the second task metadata data structure;
executing the continuation task in the processor after the one or more child tasks have finished execution; and
indicating that the first task has logically finished execution when the continuation task has finished execution,
wherein the continuation task comprises one or more instructions that are dependent on at least one intermediate value produced by the one or more child tasks.

2. The method of claim 1, wherein indicating that the first task has logically finished execution comprises decrementing a pending counter field in the first task metadata data structure.

3. The method of claim 2, wherein indicating that the first task has logically finished execution further comprises releasing one or more semaphores associated with the first task.

4. The method of claim 1, further comprising:
incrementing an input dependence field in the second task metadata data structure for each child task in the one or more child tasks that is spawned by the first task; and
decrementing the input dependence field in the second task metadata data structure when each child task in the one or more child tasks finishes execution.

5. The method of claim 1, further comprising:
generating a third task metadata data structure that represents a task that indicates that each of the one or more child tasks has finished execution; and
incrementing an input dependence field in the third task metadata data structure for each child task in the one or more child tasks that is spawned by the first task.

6. The method of claim 5, further comprising:
incrementing an input dependence field in the second task metadata data structure; and
storing a pointer to the second task metadata data structure in an output dependence field of the third task metadata data structure.

7. The method of claim 6, further comprising:
executing a third task corresponding to the third task metadata data structure in response to each of the child tasks in the one or more child tasks finishing execution; and
decrementing the input dependence field in the second task metadata data structure when the third task has finished execution.

8. The method of claim 1, wherein each of the task metadata data structures comprises a plurality of fields including a pending counter field.

9. The method of claim 1, wherein each task comprises at least one thread block including a plurality of threads executed in parallel on two or more processing units.

10. The method of claim 1, wherein the second task metadata data structure comprises a queue metadata data structure.

11. The method of claim 10, further comprising generating a queue data structure in the memory, wherein the queue data structure is associated with the second task metadata data structure.

12. The method of claim 11, wherein the queue data structure comprises a circular queue having a plurality of entries, each entry configured to store a pointer to a thread block.

13. A non-transitory computer-readable storage medium storing instructions that, when executed by a processor, cause the processor to perform steps comprising:
generating a first task metadata data structure in a memory;
generating a second task metadata data structure in the memory, wherein the second task metadata data structure is related to the first task metadata data structure;
executing a first task corresponding to the first task metadata data structure in a processor, wherein at least one instruction in the first task causes one or more child tasks to be executed by the processor;
generating state information representing a continuation task related to the first task and storing the state information in the second task metadata data structure;
executing the continuation task in the processor after the one or more child tasks have finished execution; and
indicating that the first task has logically finished execution once the continuation task has finished execution,
wherein the continuation task comprises one or more instructions that are dependent on at least one intermediate value produced by the one or more child tasks.

14. The non-transitory computer-readable storage medium of claim 13, the steps further comprising:
incrementing an input dependence field in the second task metadata data structure for each child task in the one or more child tasks that is spawned by the first task; and
decrementing the input dependence field in the second task metadata data structure when each child task in the one or more child tasks finishes execution.

15. The non-transitory computer-readable storage medium of claim 13, the steps further comprising:
generating a third task metadata data structure that represents a task that indicates that each of the one or more child tasks has finished execution; and
incrementing an input dependence field in the third task metadata data structure for each child task in the one or more child tasks that is spawned by the first task.

16. A system, comprising:
a memory; and
a processor coupled to the memory and configured to:
generate a first task metadata data structure in a memory,
generate a second task metadata data structure in the memory, wherein the second task metadata data structure is related to the first task metadata data structure,
execute a first task corresponding to the first task metadata data structure in a processor, wherein at least one instruction in the first task causes one or more child tasks to be executed by the processor,
generate state information representing a continuation task related to the first task and storing the state information in the second task metadata data structure,
execute the continuation task in the processor after the one or more child tasks have finished execution, and
indicate that the first task has logically finished execution once the continuation task has finished execution,
wherein the continuation task comprises one or more instructions that are dependent on at least one intermediate value produced by the one or more child tasks.

17. The system of claim 16, the processor further configured to:
increment an input dependence field in the second task metadata data structure for each child task in the one or more child tasks that is spawned by the first task, and
decrement the input dependence field in the second task metadata data structure when each child task in the one or more child tasks finishes execution.

18. The system of claim 16, the processor further configured to:
generate a third task metadata data structure that represents a task that indicates that each of the one or more child tasks has finished execution; and
increment an input dependence field in the third task metadata data structure for each child task in the one or more child tasks that is spawned by the first task.

19. The system of claim 16, wherein the processor comprises a graphics processing unit.

* * * * *